United States Patent Office 3,655,683
Patented Apr. 11, 1972

3,655,683
ORGANOLEAD NITROGEN COMPOUNDS
Louis C. Willemsens, Croesestraat 79,
Utrecht, Netherlands
No Drawing. Continuation-in-part of abandoned application Ser. No. 601,310, Dec. 13, 1966. This application Sept. 7, 1967, Ser. No. 665,979
Int. Cl. C07f 7/24
U.S. Cl. 260—299
24 Claims

ABSTRACT OF THE DISCLOSURE

Organolead compounds in which the lead is tetravalent and is attached directly to carbon and nitrogen. Such compounds are described generally on pages 2 and 3 of the specification and are useful as anti-wear additives for lubricants. In many instances such utility is enhanced by incorporating certain anti-oxidants. A method of preparation is also described wherein the trialkyllead hydroxide is reacted with the desired heterocyclic compound in an organic solvent with formation of the desired compound and water.

---

This application is a continuation-in-part of application Ser. No. 601,310, filed Dec. 13, 1966, and now abandoned.

The present invention relates to novel organolead compounds in which the lead atom is tetravalent and is joined directly to carbon and to nitrogen.

An object of the present invention is to prepare such organolead compounds.

Another object of the invention is to obtain such organolead compounds which are useful as additives for lubricating oils and greases.

Still another object is to devise additives which will greatly enhance the lubricating properties of oils and greases, and the anti-wear properties of oils and greases.

Still another object of the invention is to provide new organolead compounds which are useful for the purposes of known organolead compounds such as depositing a film of metallic lead on a surface by heating in the absence of air in an enclosed space.

Another object is to provide organolead compounds which possess hydrolytic stability and can therefore be made by a reaction in which water is produced as a by-product.

In general, the new compounds which meet the objects set forth above are represented by means or formulas as follows:

(a) Trialkylplumbyl cyanamide in which the alkyl group has 1 to 12 carbon atoms;

(b) 

wherein:
X=N, CH or CR'
Y=N, CH or Cφ
R=alkyl of 1 to 12 carbon atoms
R'=alkyl of 1 to 20 carbon atoms, or phenyl
R''=NHR''', H, NH$_2$, alkyl having 1 to 4 carbon atoms, or phenyl
R'''=alkyl of 1 to 12 carbon atoms, or phenyl
φ=phenyl (c) 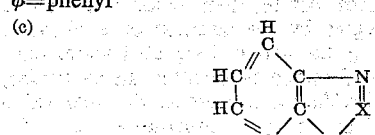

wherein X and R have the meaning defined above under (b), but the total number of carbon atoms included in the group R and R' is at least 8.

Examples of the new organolead compounds are given in Table I.

TABLE I

| No. | Name | Formula |
|---|---|---|
| 1 | (Trimethylplumbyl) cyanamide. | (CH$_3$)$_3$PbNHCN |
| 2 | N-(tributylplumbyl) imidazole. | imidazole ring with Pb—(C$_4$H$_9$)$_3$ |
| 3 | N-(tributylplumbyl) benzimidazole. | benzimidazole ring with Pb—(C$_4$H$_9$)$_3$ |
| 4 | N-(tributylplumbyl) 3-amino-1,2,4-triazole. | NH$_2$-substituted triazole with Pb—(C$_4$H$_9$)$_3$ |
| 5 | N-(tributylplumbyl) benzotriazole. | benzotriazole with Pb—(C$_4$H$_9$)$_3$ |
| 6 | N-(triethylplumbyl)-4,5-diphenylimidazole. | diphenylimidazole with Pb—(C$_2$H$_5$)$_3$ |
| 7 | N-(triheptylplumbyl) imidazole. | imidazole with Pb—(C$_7$H$_{15}$)$_3$ |
| 8 | N-(tributylplumbyl)-2-undecylbenzimidazole. | benzimidazole with C$_{11}$H$_{23}$ and Pb—(C$_4$H$_9$)$_3$ |
| 9 | N-(triethylplumbyl)-2-methyl imidazole. | 2-methylimidazole with Pb—(C$_2$H$_5$)$_3$ |
| 10 | N-(triethylplumbyl)-2-ethyl-4-methyl imidazole. | 2-ethyl-4-methylimidazole with Pb—(C$_2$H$_5$)$_3$ |
| 11 | N-(triethylplumbyl)-2-undecyl imidazole. | 2-undecylimidazole with Pb—(C$_2$H$_5$)$_3$ |

TABLE I.—Continued

| No. | Name | Formula |
|---|---|---|
| 12 | N-(triisobutylplumbyl) imidazole. | HC═══N<br>‖   ‖<br>HC   CH<br>  \\ /<br>   N<br>   \|<br>   Pb—[CH$_2$—CH(CH$_3$)$_2$]$_3$ |
| 13 | N-(triethylplumbyl)-2-(branched chain) undecylimidazole. | HC═══N<br>‖   ‖<br>HC   C—C$_{11}$H$_{23}$<br>  \\ /<br>   N<br>   \|<br>   Pb—(C$_2$H$_5$)$_3$ |
| 14 | N-(triethylplumbyl) imidazole. | HC═══N<br>‖   ‖<br>HC   CH<br>  \\ /<br>   N—Pb—(C$_2$H$_5$)$_3$ |
| 15 | 3-anilino-5-isopropyl-N-(tributylplumbyl)-1,2,4-triazole. | φ—NH—C═══N<br>‖   ‖<br>   N   C—CH(CH$_3$)$_2$<br>  \\ /<br>   N<br>   \|<br>   Pb—(C$_4$H$_9$)$_3$ |
| 16 | 3-amino-5-phenyl-N-(tributylplumbyl)-1,2,4-triazole. | NH$_2$—C═══N<br>‖   ‖<br>   N   C—φ<br>  \\ /<br>   N<br>   \|<br>   Pb—(C$_4$H$_9$)$_3$ |
| 17 | 3-(n-dodecylamino)-N-(tributylplumbyl)-1,2,4-triazole. | (C$_{12}$H$_{25}$)NH—C═══N<br>‖   ‖<br>   N   CH<br>  \\ /<br>   N<br>   \|<br>   Pb—(C$_4$H$_9$)$_3$ |
| 18 | 3-(n-butylamino)-N-(tributylplumbyl)-1,2,4-triazole. | (C$_4$H$_9$)—NH—C═══N<br>‖   ‖<br>   N   CH<br>  \\ /<br>   N<br>   \|<br>   Pb—(C$_4$H$_9$)$_3$ |

PREPARATION OF COMPOUNDS 15–18

The preparation of these compounds is effected by mixing tributylplumbyl hydroxide with the desired 1,2,4-triazole in an organic solvent, followed by recrystallization from ethanol, in the same manner as is set forth under "Preparation of the Cyclic Compounds, such as Compounds 2–14, inclusive," infra.

In addition to the foregoing, there may be mentioned (tributylplumbyl)cyanamide, (tridodecylplumbyl)cyanamide, N-(tributylplubyl)-2-eicosyl imidazole and N-(tributylplumbyl)-4-butyl imidazole. In the above formulas, the alkyl groups are normal unless otherwise indicated. However, any branched chain alkyl of the same number of carbon atoms may be substituted. Furthermore, in order to provide solubility of the compounds in lubricating oils and greases, it is desirable that the total number of carbon atoms in the alkyl and phenyl groups attached to the imidazole or triazole ring should not be greater than 35, and preferably not greater than 20.

Following are descriptions of the methods for preparing the compounds identified above.

PREPARATION OF COMPOUND 1

Trimethyllead cyanamide was prepared by adding an equimolar amount of cyanamide to trimethyllead hydroxide in ethanol. Upon concentrating the solution, the compound crystallized.

PREPARATION OF THE CYCLIC COMPOUNDS, SUCH AS COMPOUNDS 2–14, INCLUSIVE

A triorganolead hydroxide is mixed with the desired heterocyclic compound (which are available in the market) in an organic solvent, followed by recrystallization from ethanol.

Thus in preparing N-(tributylplumbyl) imidazole (Compound No. 2) an ethereal tributyllead bromide solution (prepared from 1 mole of lead dichloride) was stirred with excess of silver oxide (from 100 g. of silver nitrate) until bromide-free (ca. 30 min.). The precipitate of silver bromide was separated by filtration and to the remaining solution there was added 34.4 g. of imidazole (0.507 mole) with stirring to dissolve the imidazole and the whole was evaporated to dryness. The residue after solidifying was recrystallized from 500 ml. of 96% ethanol to give 210 g. of N-(tributylplumbyl) imidazole (93% based on the hydroxide, 71% based on lead dichloride).

In the following table, there are listed the physical properties and analyses of some of the compounds of the invention.

TABLE II

| Compound | M.P. or decomposition temp. (° C.) | Found C | Found H | Found N | Found Pb | Calculated C | Calculated H | Calculated N | Calculated Pb |
|---|---|---|---|---|---|---|---|---|---|
| HC═══N<br>‖   ‖<br>HC   CH<br>  \\ /<br>   N—Pb—(C$_2$H$_5$)$_3$ | d. 100± | | | 7.49 | 57.06 | | | 7.75 | 57.32 |
| (No. 2, Table I) | m. 48–50 | | | 6.20 | 46.49 | | | 6.29 | 46.50 |
| (No. 12, Table I) | m. 167 | | | | | | | | |
| HC═══N<br>‖   ‖<br>N   CH<br>  \\ /<br>   N—Pb—(C$_2$H$_5$)$_3$ | | | | 11.83 | | | | 11.60 | |
| NH$_2$—C═══N<br>‖   ‖<br>N   CH<br>  \\ /<br>   N—Pb—(C$_2$H$_5$)$_3$ | m. 178–181 | | | 15.52 | | | | 14.84 | |
| (No. 4, Table I) | m. 116–118 | | | 12.45 | 44.83 | | | 12.14 | 44.89 |
| (No. 3, Table I) | m. 104–105 | 45.70 | 6.37 | 9.04 | 42.07 | 46.04 | 6.51 | 8.46 | 41.72 |
| (No. 5, Table I) | m. 103 | | | | | | | | |
| (No. 1, Table I) | d. 126–127 | | | 9.71 | 70.82 | | | 9.55 | 70.64 |
| (C$_4$H$_9$)$_3$PbNHCN | Oil | | | 6.34 | 49.60 | | | 6.68 | 49.38 |

The above compounds have been found to be highly valuable as additives to lubricating oils particularly hydrocarbon oils for the purpose of preventing abrasive wear and scuffing or seizure under boundary lubrication conditions. They may also be used with similar effect in greases.

While the compounds of the invention are valuable lubricating oil additives, per se, their action is enhanced to a considerable degree by the addition of a phenolic type of antioxidant e.g. the herein designated antioxidant A, to be more fully identified hereinafter. In particular, the action of the antioxidant is to increase the wear value of the lubricating oil at a higher temperature, e.g. 125°. It also has the beneficial effect of increasing the solubility of the lead nitrogen compounds of the invention, thus enabling compounds that are otherwise too sparingly soluble in the oil to be used.

The principal tests indicating the value of additives for the purposes above mentioned were conducted in the Shell 4-Ball Wear Tester, a well known device, the details of which may be had from the description thereof contained in Lubricating Engineering, volume 1, page 35, 1945. In this device, a one-half inch metal ball is rotated under a specified load against three similar balls clamped together in an equilateral triangle. These balls are contained in a heated cup filled with the lubricant. The bulk temperature of the lubricant is measured by a thermocouple inserted in a thermowell in the cup. Torque on the lower ball holder is a measure of the frictional resistance at the rubbing surfaces, and is continuously measured by means of a strain gauge and recorder. The rubbing of the upper ball in the presence of the lubricant against the lower three produces circular concave scars on the lower balls.

With no wear, the balls will have a minimum scar diameter (Hertz diameter) which is the result of plastic deformation of the balls, and is determined by the modulus of elasticity of the material and the load applied. After a wear run, the three scars are measured to 0.01 mm. under a microscope, and the average diameter of the scars is a measure of the wear, and the basis for computation of the unit pressure.

The pressure in the contact zone of balls in the 4-ball test decreases greatly during the course of the test, since the load remains constant, while the wear scar area supporting it, increases. For example, with a 15 kg. load on SAE 52-100 steel balls, the scar diameter is approximately 0.22 mm., which corresponds to a pressure of 230,000 lbs./in.$^2$. When the scar diameter reaches 0.5 mm., the pressure has dropped to 45,000 lbs./in.$^2$.

One type of 4-ball test is designed to measure resistance to abrasive wear. In this test, the bulk lubricant temperature is held at 50° or at 125° C., the rotational speed is 1800 r.p.m., and the load is 15 kg. The test is continued, with periodic interruption for measurement, until the average scar diameter has increased to 0.47 mm., corresponding to zone pressure of 50,000 p.s.i. The time required to reach this scar diameter is designated as the "wear time." Effective antiwear additives may increase the wear time from 11–18 minutes to 100 minutes or more.

Tests of the above named compounds carried out in the 4-ball tester in mineral oil as above described are shown in Table III. The mineral oil used is a commercial product (Humble Oil Co.) designated Bayol 85, a highly refined paraffinic white oil of viscosity 17 centistokes at 100° F., which is widely used in lubrication studies.

TABLE III

| 1 | 2 | 3 | 4 | 5 | 6 | 7 |
|---|---|---|---|---|---|---|
| | Color | Oil solubility [1] | | Wear time, min. | | |
| | reaction in clear | | | Clear oil | | |
| Additive | oil | No Ao A[2] | With Ao A | 50° | 125° | Ao A 125° |
| None | | | | 18 | 11 | |
| 1 | No | Low | Low | 3,000+ | 120 | 800–2,400 |
| 2 | Yes | Medium | High | 3,000+ | 250 | 3,000+ |
| 3 | | Low | | 3,000+ | 90 | |
| 4 | | Low | | 3,000+ | 150 | |
| 5 | No | Low | | [3] 2,500 | 39 | |
| 7 | Yes | Medium | High | 3,000+ | | 600 |
| 8 | Yes | do | do | 3,000+ | | 35 |
| 10 | Yes | do | Medium | 3,000+ | 100 | 70 |
| 11 | Yes | High | High | 3,000+ | 150 | 900+ |
| 12 | No | Low | | 3,000+ | 150 | |
| 14 | Yes | Low | | 3,000+ | 100 | |

[1] Percentage by weight of lead in oil.
[2] Antioxidant A:

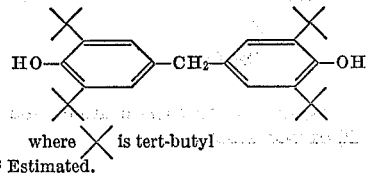

where ✕ is tert-butyl
[3] Estimated.

The following explanation is given of the columns in the above table:

Column 2—in general, color reaction is indicative of favorable action of the additive.

Column 3—gives solubilities with no antioxidant added. In general, "low" means of a magnitude of 0.1% or less by weight of the oil; "med." (medium) of 0.5%; "high" over .1%.

As will be evident, solubility of the additive in the oil is an important factor determining its suitability. A number of compounds which have a structure which should enable them to qualify as additvies turn out to have too low solubility. In some instances, the additives show up better in the wear-time tests than their solubility would warrant. The explanation is that in the tests some of the additive remains in suspension. Therefore, the solubility factor must be taken into consideration along with the weartime factor.

The effect of pre-heating the mineral oil-additive solution was ascertained by heating such mixture for two hours at 125° in the test cup of the 4-ball tester before starting the wear test at that temperature. In the case of Compound 4, such pre-heating raised the wear time at 125° from 150 minutes to in excess of 1560 minutes.

While antioxidant A improved the action of the additives, it did not, of itself, show any antiwear activity. Thus when present in an amount of 0.5% of the oil, the wear-time was substantially the same as indicated for the clear oil alone in the first line of the above table.

A second type of 4-ball test, using a commercial non-additive lubricating oil, was designed to measure the proection against scuffing or seizure afforded by the oil under extreme pressure (E.P.) conditions of boundary lubrication. In this test, a series of separate runs, each one for one hour, was carried out at different loads progressively increasing up to a maximum of 50 kg. The oil temperature was 110° or 75°; the rotational speed was 1800 r.p.m. Upon reaching a "critical load," the one-hour scar diameter increased abruptly from about 0.5 mm. to 1.5–2 mm., as a result of scuffing and seizure. This critical load test constitutes an important evaluation of automotive engine oils, for which a critical load of 45 kg. is sometimes chosen as the minimum acceptable.

Compound 2 was selected for submission to this critical load test, as shown in Table IV.

TABLE IV.—CRITICAL LOAD TESTS
[SAE 20 oil at 110° for 60 min., Antioxidant A (0.6%), 1% lead level, except as noted]

| | S car diameter, mm. | | | |
|---|---|---|---|---|
| Load kg. | Scar dia. | Scar dia. 0.2% Pb | Scar dia. antiox. 2-fold | Scar dia. at 75° |
| 30 | 0.29 | 0.45 | | |
| 35 | .33 | 0.25 | | |
| 40 | .38 | 1.60 | 0.34 | 0.31 |
| 45 | .35, .81 | | .57 | .33 |
| 50 | .83, .96 | | .94 | .38 |
| Estimated critical load, kg. | | | | |
| | 50 | 36 | 50 | >50 |

A control test in which anti-oxidant was present, but no lead was present, developed a scar diameter of 1.58 mm. at a 30 kg. load at 110° C. in 60 minutes. At 40 kg. load the scar diameter was 1.86 mm. The estimated critical load was 26 kg.

It will be noted that when the concentration of Compound 2 was reduced to the 0.2% lead level, the protection was considerably reduced, the critical load falling from 50 kg. at 1% to 36 kg. at 0.2%. Doubling the amount of antioxidant A was of no further benefit to Compound 2. At 75° there was comparatively little wear in the presence of Compound 2, even at 50 kg. load.

In addition to an antiwear agent and an anti-oxidant, a detergent-dispersant additive [inter alia] is also recommended for a finished premium motor oil. It was found the the compounds of this invention were entirely compatible with the mixture of known antioxidant and detergent dispersants, as for example, 2.0% Oronite 1200 (a commercial, ashless-type material of unspecified composition, molecular weight about 1000-1200) which is well known for this latter purpose. Further, the compounds of the invention were also compatible with rust inhibitors, commonly used in present day automotive engine oils, as for example, 0.5% Bryton C-45 (a commercial material comprising an overbased calcium sulfonate, molecular weight 400-600). Further, under some conditions of use, a well known corrosion inhibitor may be used with advantage, as for example, .50% Amoco 48 (a commercial material of unspecified composition, believed to be a sulfurized terpene). The latter type additive is particularly useful where the oil will come into contact with copper, as for example, in the bearings or shaft. The percentage of Amoco 48 may be reduced to as low as .05% in some instances. The amount of lead compound required may vary from a maximum of 1% lead, based upon the weight of the oil, to as little as .15%. When the corrosion inhibitor was present, the amount of lead was desirably increased somewhat above the minimum, as for example, to the minimum amount of .5%.

The compounds of the invention, when used as additives to lubricating oil, were subjected to other known test procedures including:

(1) Rust prevention test

This is an adaptation of an established test (ASTM D-665) of the rusting tendency of turbine oils. A rough-surfaced steel spindle is immersed in the test oil for 24 hours at 140° F. and the oil kept saturated by stirring in water, or in a modified test with hydrochloric acid.

(2) Panel coker test

This is a thermal stability bench test developed by Ethyl Corporation and used in other laboratories. An aluminum alloy panel 1.5 x 3.5 inches in size is heated in a closed box for 10 hours at 550° F. Once every minute, hot test oil is sprayed onto the panel in an established pattern for a period of 5 seconds. The remaining seconds afford an opportunity for the oil film to form an adherent deposit of coke. At the end of the test, the appearance of the panel is observed and the total weight increase is measured.

(3) Polyveriform test

This is a well known bench test that measures the tendency of the oil to oxidize and the consequent corrosion of copper-lead bearings.

(4) Oldsmobile cam and tappet wear test

In this test a 1960 Oldsmobile engine is fitted with calibrated valve lifter springs having 50% greater force than normal and is operated under standard conditions and the amount of scuffing of the cams and valves measured.

(5) L-38 oil oxidation test

This is similar to the polyveriform bench test above mentioned and provides a severe test of oil's resistance at high temperature and its tendency to cause copper-lead bearing corrosion.

The foregoing tests are standard and detailed descriptions thereof need not be reproduced here. The presence of Compound 2, for example, together with any of the other additives called for enables the lubricating oil satisfactorily to pass these several tests.

Lubricating oil containing Compound 2 was also added to isooctane for the lubrication of a two-cycle outboard engine and proved to be a powerful antiwear agent. As little as 0.047% lead in the oil or 18 parts per million in the fuel-oil blend completely prevented wear. One-half this amount produced substantial reduction thereof.

I claim:
1. The compound having the structural formula of the class consisting of:
    (a) trialkylplumbyl cyanamide in which the alkyl group has 1 to 12 carbon atoms;

(b) 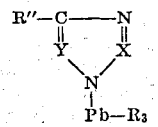

wherein
X=N, CH or CR'
Y=N, CH or Cφ
R=alkyl of 1 to 12 carbon atoms
R'=alkyl of 1 to 20 carbon atoms
R''=H, NH$_2$, alkyl having 1 to 4 carbon atoms, or phenyl
φ=phenyl (c) 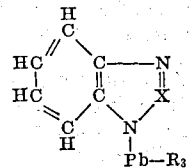

wherein X and R have the meaning defined above under (b), but the total number of carbon atoms included in the groups R and R' is at least 8.

2. The organolead nitrogen compound described in claim 1: N-(triheptylplumbyl)imidazole.
3. The organolead nitrogen compound described in claim 1: N-(tributylplumbyl)imidazole.
4. The organolead nitrogen compound described in claim 1: N-(trimethylplumbyl) cyanamide.
5. The organolead nitrogen compound described in claim 1: N-(tributylplumbyl)benzimidazole.
6. The organolead nitrogen compound described in claim 1: N-(tributylplumbyl)3-amino-1,2,4-triazole.
7. The organolead nitrogen compound described in claim 1: N-(tributylplumbyl)benzotriazole.
8. The organolead nitrogen compound described in claim 1: N-(triethylplumbyl)-4,5-diphenylimidazole.
9. The organolead nitrogen compound described in claim 1: N-(tributylplumbyl)-2-undecylbenzimidazole.
10. The organolead nitrogen compound described in claim 1: N-(triethylplumbyl)-2-methyl imidazole.
11. The organolead nitrogen compound described in claim 1: N-(triethylplumbyl)-2-ethyl-4-methyl imidazole.
12. The organolead nitrogen compound described in claim 1: N-(triethylplumbyl)-2-undecyl imidazole.
13. The organolead nitrogen compound described in claim 1: N-(triisobutylplumbyl)imidazole.
14. The organolead nitrogen compound described in claim 1: N-(trialkylplumbyl)imidazole in which the alkyl group has 1 to 12 carbon atoms.
15. The organolead nitrogen compound described in claim 1: N-(trialkylplumbyl)imidazole

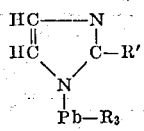

in which R is alkyl having 1 to 12 carbon atoms and R' is alkyl having 1 to 20 carbon atoms.

16. The compound having the structural formula

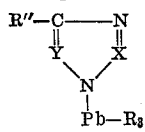

wherein
X=N, CH or CR'
Y=N, CH or Cφ
R=alkyl of 1 to 12 carbon atoms
R'=phenyl or alkyl of 1 to 12 carbon atoms
R"=NHR'''
R'''=alkyl of 4 to 12 carbon atoms, or phenyl
φ=phenyl.

17. The compound having the structural formula

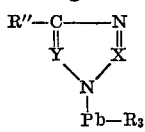

wherein
X=CR'
Y=N, CH or Cφ
R=alkyl of 1 to 12 carbon atoms
R'=phenyl
R"=H, NH$_2$, alkyl having 1 to 4 carbon atoms, or phenyl
φ=phenyl or

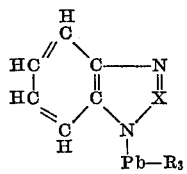

wherein X and R have the meaning defined above, but the total number of carbon atoms included in the group R and R' is at least 8.

18. The organolead nitrogen compound described in claim 16: 3-anilino-5-isopropyl-N-(tributylplumbyl)-1,2,4-triazole.

19. The organolead nitrogen compound described in claim 2: 3 - amino - 5 - phenyl-N-(tributylplumbyl)-1,2,4-triazole.

20. The organolead nitrogen compound described in claim 16: 3-(n-dodecylamino)-N-(tributylplumbyl)-1,2,4-triazole.

21. The organolead nitrogen compound described in claim 16: 3 - (n - butylamino)-N-(tributylplumbyl)-1,2,4-triazole.

22. The organolead-nitrogen compound described in claim 1, category (a).

23. The organolead-nitrogen compound described in claim 1, category (b).

24. The organolead-nitrogen compound described in claim 1, category (c).

References Cited

Willemsens, Organolead Chemistry, (New York, 1964), pp. 54, 89 (art unit 112).

Willemsens et al., Investigations In the Field of Organolead Chemistry (ILZRO, Inc., 1965), pp. 69–70 (Scientific Library).

Braun et al., Gummi Asbest Kunstst., vol. 19, pp. 1353–1356 (1966).

Hofmann, Imidazole and Derivatives, Part 1 (Interscience, N.Y., 1953), pp. 15–16 and 249.

ALTON D. ROLLINS, Primary Examiner

U.S. Cl. X.R.

208—19; 252—49.7; 260—437 R

PO-1050
(5/69)

UNITED STATES PATENT OFFICE
CERTIFICATE OF CORRECTION

Patent No. 3,655,683                    Dated April 11, 1972

Inventor(s) Louis C. Willemsens

It is certified that error appears in the above-identified patent and that said Letters Patent are hereby corrected as shown below:

Page 2

Column 5, line 46 and Column 6, line 21 "4-ball tester" should be --4-Ball Tester--
Column 5, line 49, "highly refined" should be --highly-refined--
Column 6, lines 31-32, "proection" should be --protection--
Column 6, Table IV, line 50, "S car" should be --Scar--
Column 6, Table IV, line 54, "0.25" should be --0.52--
Column 6, Table IV, line 56, ".57" should be --0.47--
Column 7, line 2, "the the" should be --that the--
Column 10, line 7 (Claim 19), "claim 2" should be --claim 17--

Signed and sealed this 8th day of May 1973.

(SEAL)
Attest:

EDWARD M. FLETCHER, JR.
Attesting Officer

ROBERT GOTTSCHALK
Commissioner of Patents